United States Patent
Kaku

(10) Patent No.: US 6,750,915 B2
(45) Date of Patent: Jun. 15, 2004

(54) DIGITAL CAMERA HAVING BATTERY LIFE DETERMINER

(75) Inventor: Junya Kaku, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/329,354

(22) Filed: Dec. 26, 2002

(65) Prior Publication Data

US 2003/0137596 A1 Jul. 24, 2003

(30) Foreign Application Priority Data

Jan. 23, 2002 (JP) ........................ 2002-014050

(51) Int. Cl.7 .................. H04N 5/225; H04N 5/235; G03B 7/26
(52) U.S. Cl. .................. 348/372; 348/362; 396/279
(58) Field of Search .................. 348/211.6, 372; 396/264, 279

(56) References Cited

U.S. PATENT DOCUMENTS

| | | | |
|---|---|---|---|
| 4,272,176 A | * | 6/1981 | Maitani et al. ............ 396/221 |
| 4,472,045 A | * | 9/1984 | Alyfuku et al. ............ 396/264 |
| 5,311,354 A | * | 5/1994 | Kamiya et al. ............ 359/426 |
| 5,527,630 A | * | 6/1996 | Nagata et al. ............. 429/7 |
| 5,555,071 A | * | 9/1996 | Koenig et al. ............. 396/155 |
| 5,727,241 A | * | 3/1998 | Yamano et al. ............ 396/279 |
| 6,411,780 B1 | * | 6/2002 | Maruyama ............... 396/59 |
| 6,512,548 B1 | * | 1/2003 | Anderson .............. 348/333.05 |

FOREIGN PATENT DOCUMENTS

JP    09281542 A    * 10/1997    ............ G03B/7/26

* cited by examiner

*Primary Examiner*—Ngoc-Yen Vu
*Assistant Examiner*—Timothy J. Henn
(74) *Attorney, Agent, or Firm*—Gerald T. Bodner

(57) ABSTRACT

A digital camera includes a shutter button. After a lapse of 10 seconds from an operation of the shutter button, an image sensor is subjected to main exposure, and a compressed image signal thus obtained is recorded onto a recording medium. It is noted that a remaining amount of a battery is determined by a CPU just before the main exposure. If the remaining amount of the battery is not enough, messages are generated from a tally lamp and a speaker, and the main exposure is cancelled.

5 Claims, 3 Drawing Sheets

DIGITAL CAMERA HAVING BATTERY LIFE DETERMINER

BACKGROUND OF THE INVENTION

1. Field of the Invention

The present invention relates to a digital camera. More specifically, the present invention relates to a digital camera that photographs an object at a time of accepting a photographing instruction.

2. Description of the Prior Art

A recent digital camera is equipped with a self-timer photographing function as well as a silver salt film camera. When the self-timer photographing function is activated and then, a shutter button is operated, photographing is executed after a lapse of a predetermined time period (e.g., 10 seconds) from the operation. Therefore, an operator himself can join objects.

However, when a battery power is run out directly after starting a timer, the photographing is not normally executed. At this time, since the operator is away from the camera so as to join the objects, there is a possibility that no one recognizes that the photographing is not normally executed due to an insufficient battery.

SUMMARY OF THE INVENTION

Therefore, it is a primary object of the present invention to provide a digital camera allowing a person who is an object to recognize an insufficient battery with ease.

According to the present invention, a digital camera for performing main exposure on an image sensor after a lapse of a predetermined time period from accepting a photographing instruction and recording on a recording medium an image signal obtained by the main exposure comprises a determiner for determining a remaining amount of a battery just before the main exposure; and a generator for generating a message depending upon a determination result of the determiner.

After a lapse of the predetermined time period from accepting the photographing instruction, the image sensor is subjected to the main exposure, and the image signal thus obtained is recorded on the recording medium. It is noted that the remaining amount of the battery is determined by the determiner just before the main exposure, and the message is generated by the generator depending upon the determination result. The generation of the message allows the object to recognize the insufficient battery.

Preferably, the remaining amount of the battery is determined by the determiner after adjusting photographing conditions. In a case of adjusting the photographing conditions on the basis of an image signal obtained by pre-exposure of the image sensor, the remaining amount of the battery is also decreased by the adjusting process. When paying attention to the remaining amount of the battery after adjusting the photographing conditions, it is possible to surely and easily determine whether or not the image signal based on the main exposure is recorded.

Preferably, the pre-exposure is performed on the image sensor during at least a period from accepting the photographing instruction to the lapse of the predetermined time period, and an image based on the image signal obtained by the pre-exposure is displayed on a displayer. The remaining amount of the battery is also decreased by such an image display. Accordingly, whether recording of the image signal based on the main exposure is possible or not has to be determined from the remaining amount of the battery just before the main exposure, that is, the remaining amount of the battery after the operator is away from the camera.

In a case of being provided with a lamp blinking in a first cycle just before the main exposure, the generator blinks the lamp in a second cycle.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
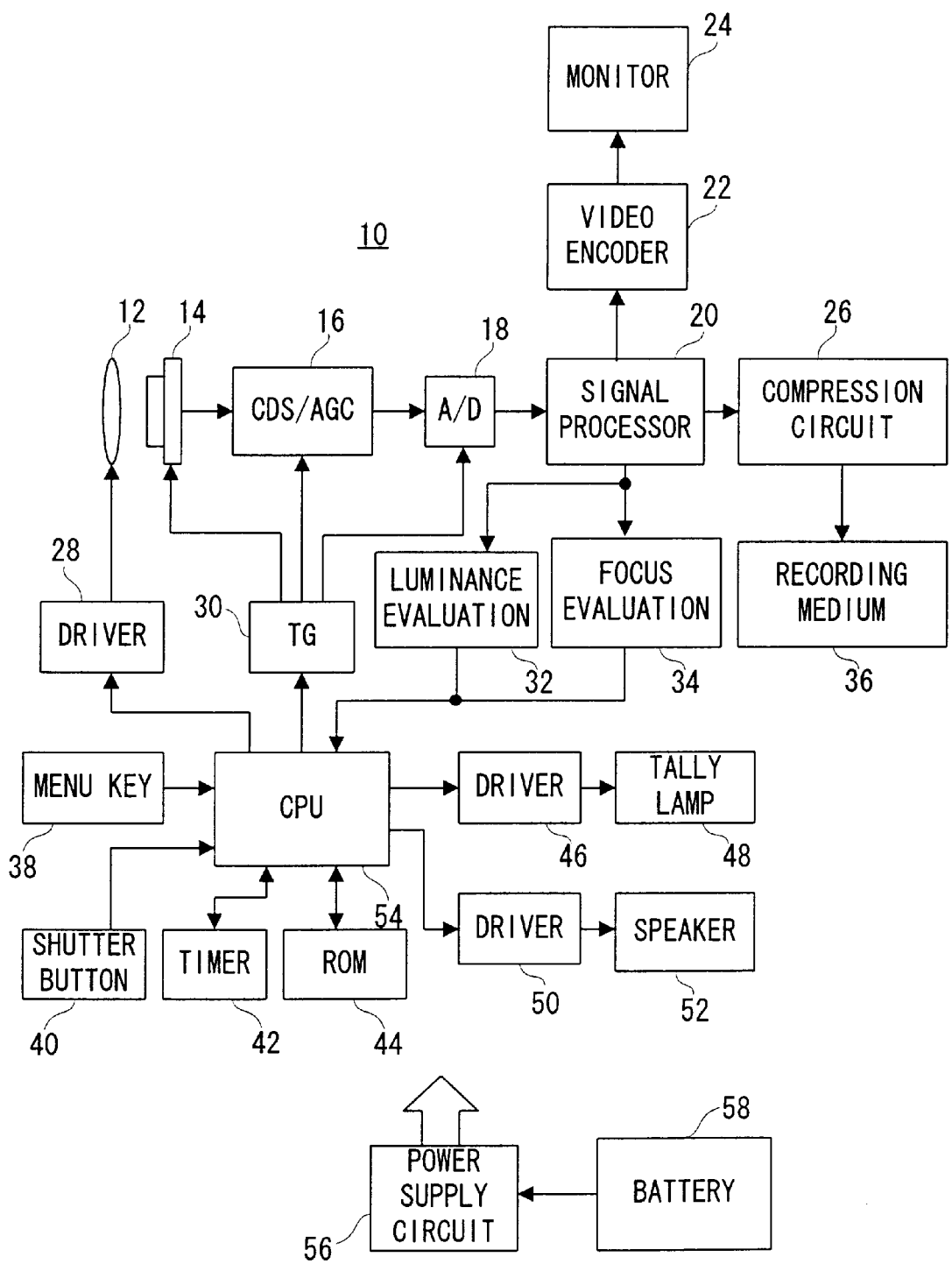
FIG. 1 is a block diagram showing one embodiment of the present invention.

Referring to FIG. 1, a digital camera 10 of this embodiment includes a battery 58 as a power source. When a power switch (not shown) is turned on, power based on the battery 58 is applied to a whole system by a power supply circuit 56.

A CPU 54 performs a through image display process in response to power-on of the power switch. The CPU 54 first instructs a timing generator TG 30 to repeatedly perform pre-exposure and thin-out reading. The TG 30 performs the pre-exposure on an image sensor 14 in response to a vertical synchronization signal and reads a part of electrical charges obtained by the pre-expo sure on a next frame. A raw image signal having a reduced resolution is output from the image sensor 14 every one frame of period. The output raw image signal of each frame is applied to an image processing circuit 20 via a CDS/AGC circuit 16 and an A/D converter 18.

The signal processing circuit 20 performs a series of processes such as color separation, white balance adjustment, gamma correction and YUV conversion and thereby inputs a YUV signal thus generated to a video encoder 22. The video encoder 22 converts the input YUV signal into a composite image signal in an NTSC format and applies the composite image signal to a monitor 24. Consequently, a real-time motion image (through image) of the object is displayed on a monitor screen.

When a shutter button 40 is operated in a state a self-timer photographing mode is selected by a menu key 38, the CPU 54 activates a timer 42 so as to count a time and causes a driver 46 to turn a tally lamp 48 on during first 7 seconds. After a lapse of 7 seconds, the CPU 54 causes the driver 46 to blink the tally lamp 48 in a cycle of 1 second during successive 3 seconds. The tally lamp 48 is placed at a position which the object can visually recognize (e.g., front surface of the camera), and the blinking of the tally lamp 48 in a cycle of 1 second is a message of executing the photographing soon. It is noted that the TG 30 repeatedly performs the exposure and the thin-out reading on the image sensor 14 also after the shutter button 40 is operated, and the through image is successively displayed on the monitor 24.

After a lapse of 10 seconds, the CPU 54 adjusts photographing conditions such as focus, an amount of exposure and etc. The CPU 54 first instructs the TG 30 to repeatedly perform the pre-exposure and reading of all pixels. The TG 30 performs the pre-exposure on the image sensor 14 in response to the vertical synchronization signal and reads all the electrical charges generated by the pre-exposure on a next frame. Therefore, a raw image signal having high resolution is output from the image sensor 14 and applied to the signal processing circuit 20 via the CDS/AGC circuit 16 and the A/D converter 18. The signal processing circuit 20 performs the above-described color separation, the white balance adjustment and the YUV conversion on the applied raw image signal so as to generate a YUV signal.

A Y signal forming the YUV signal is applied to a luminance evaluation circuit 32 and a focus evaluation circuit 34. The luminance evaluation circuit 32 calculates a luminance evaluation value by integrating the Y signal every frame, and the focus evaluation circuit 34 calculates a focus evaluation value by integrating a high-frequency component of the Y signal every frame. The calculated luminance evaluation value and focus evaluation value are applied to the CPU 54. The CPU 54 controls the driver 28 on the basis of the focus evaluation value so as to set the focus lens 12 to a focal position. The CPU 54 furthermore calculates an optimal exposure period on the basis of the luminance evaluation value so as to set the TG 30 to the optimal exposure period.

After completion of adjusting the photographing conditions, the CPU 54 executes a photographing process. More specifically, the CPU 54 instructs the TG 30 to perform one frame of main exposure and one frame of reading of all pixels, and instructs a compression circuit 26 to perform a compression process. The TG 30 executes main exposure according to the set optimal exposure period and reads all the electrical charges generated by the main exposure from the image sensor 14. The read one frame of raw image signal is applied to the signal processing circuit 20 via the CDS/AGC circuit 16 and the A/D converter 18. A series of the above-described processes is executed in the signal processing circuit 20, and a YUV signal thus generated is output to the compression circuit 26. The compression circuit 26 compresses the input YUV signal by a JPEG format so as to record a compressed image signal on a recording medium 36 in a file format.

It is noted that the above-described photographing process is performed at a time the remaining amount of the battery 54 is sufficient. Where the remaining amount of the battery 54 is insufficient, the photographing process is cancelled. For self-timer photographing, an operator is away from the digital camera 10 and therefore, the CPU 54 outputs a message in order to notify cancellation of the photographing process to surroundings.

More specifically, the CPU 54 causes the driver 46 to change a blinking cycle of the tally lamp 48 and causes a driver 50 to generate a beep from a speaker 52. The blinking cycle is changed from 1 second to 0.5 second. Such the visual and audible messages allow the objects including the operator to recognize the cancellation of the photographing process due to the insufficient battery.

Figure 2:
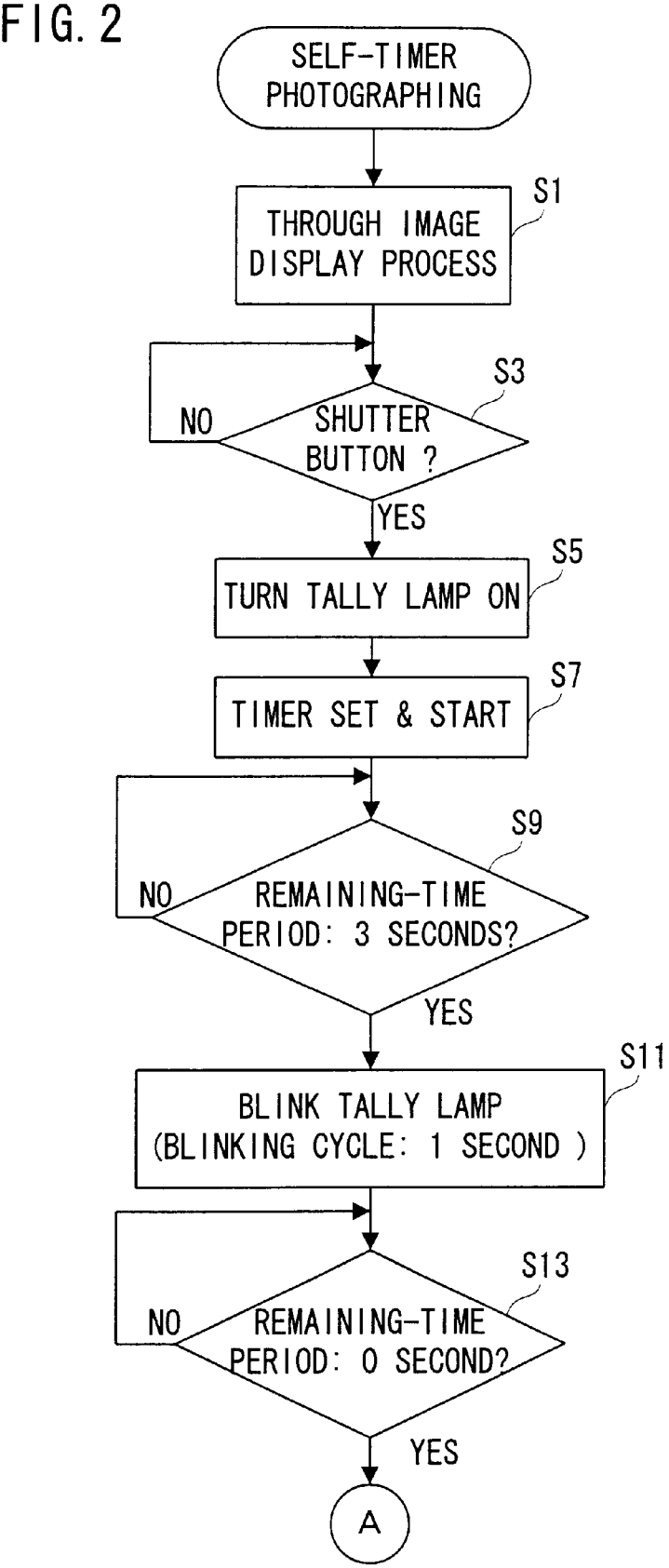
FIG. 2 is a flowchart showing a part of an operation of FIG. 1 embodiment.
Figure 3:
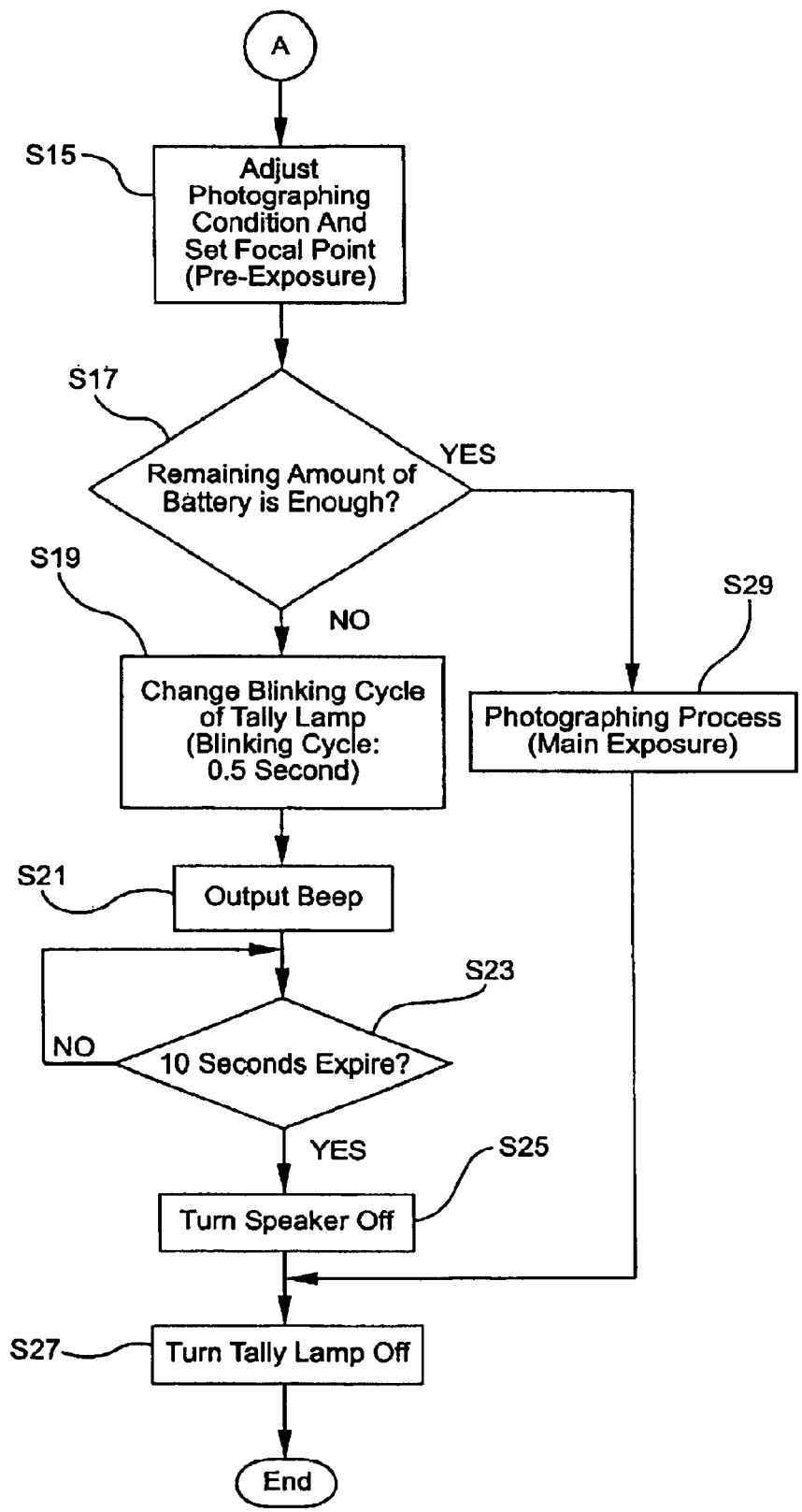
FIG. 3 is a flowchart showing another part of the operation of FIG. 1 embodiment.

The CPU 54 specifically operates according to flowcharts shown in FIG. 2 and FIG. 3. It is noted that a program corresponding to the flowcharts is stored in a ROM 44.

First, a through image display process is performed in a step S1. The image sensor 14 is subjected to the pre-exposure and the thin-out reading, and a through image based on an image signal thus obtained is displayed on the monitor 24. It is determined whether or not the shutter button 40 is operated in a step S3, and if "YES" is determined, the driver 46 is activated in a step S5. The tally lamp 48 is turned on by the driver 46, and whereby, the object recognizes a start of the self-timer photographing. In a step 57, time period data of 10 seconds is set to the timer 42, and the timer 42 is started. The time period data set to the timer 42 is decremented every 1 second. When a remaining-time period of the timer 42 becomes "3 seconds", "YES" is determined in a step S9, and the blinking cycle "1 second" is set to the driver 46 in a step S11. The driver 46 blinks the tally lamp 48 in a cycle of 1 second. When the remaining-time period of the timer 42 becomes "0 second", "YES" is determined in a step S13, and the photographing conditions are adjusted in a step S15. That is, the focus lens 12 is set to the focal position and the TG 30 is set to the optimal exposure period on the basis of the image signals obtained by the pre-exposure and the reading of all the pixels of the image sensor 14.

After completion of adjusting the photographing conditions, it is determined whether or not the remaining amount of the battery 58 is enough to perform the photographing process in a step S17. Herein, if it is determined the remaining amount is enough, the photographing process is performed in a step S29. The image sensor 14 is subjected to the one frame of main-exposure and the one frame of reading of all pixels, and a compressed image signal based on a raw image signal thus obtained is recorded on the recording medium 24 in the file format. After completion of the photographing process, the tally lamp 48 is turned off by the driver 46 in a step S27, and the process is ended. On the other hand, if it is determined the remaining amount of the battery is not enough in a step S17, the CPU 54 sets the blinking cycle "0.5 second" to the driver 46 in a step S19, and activates the driver 50 in a step S21. Therefore, the tally lamp 48 blinks in a cycle of 0.5 second, and the beep is output from the speaker 52. After a lapse of 10 seconds from determination of "YES" in the step S17, "YES" is determined in the step S23, and the drivers 50 and 46 are turned off in steps S25 and S27, respectively. Therefore, the beep is stopped, and the tally lamp 48 is turned off.

As understood from the above description, after a lapse of 10 seconds from the operation of the shutter button 40, the image sensor 14 is subjected to the main exposure, and the compressed image signal thus obtained is recorded on the recording medium 36. It is note that the remaining amount of the battery 58 is determined by the CPU 54 just before the main exposure, and if the remaining amount is not enough, messages are generated from the tally lamp 58 and the speaker 52 and the main exposure is cancelled. Therefore, persons who are the object (including the operator) can recognize depletion of the battery with ease by the occurrence of the messages.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera, comprising:
   an adjuster for adjusting a focus when accepting a photographing instruction;
   a determiner for determining whether or not a remaining amount of a battery is sufficient after adjustment by said adjuster;
   a first processor for performing a photographing process when a determination result of said determiner is affirmative; and
   a second processor for performing a message generating process in place of the photographing process when the determination result of said determiner is negative, wherein said adjuster includes a first pre-exposure performer for repeatedly performing pre-exposure on said image sensor till a focal point is detected, and a searcher for searching the focal point on the basis of image signals obtained by the pre-exposure of said first pre-exposure performer, and the photographing process includes a main exposure process for performing main exposure on said image sensor, and a recording process for recording to a recording medium the image signal obtained by the main exposure.

2. A digital camera according to claim 1, wherein the photographing process is performed after a lapse of a predetermined time period from accepting the photographing instruction.

3. A digital camera according to claim 2, further comprising:

a second pre-exposure performer for performing pre-exposure on said image sensor during at least a period from accepting the photographing instruction to an expiration of the predetermined time period; and a displayer for displaying an image based on an image signal obtained by the pre-exposure of said second pre-exposure performer.

4. A digital camera according to claim 2, further comprising a lamp which is provided at a position visible from a side of an object and blinks in a first cycle immediately before the main exposure process, wherein said message generating process is a process for instructing said lamp to blink in a second cycle.

5. A photographing control method of a digital camera, comprising the steps of:

(a) adjusting a focus when accepting a photographing instruction;

(b) determining whether or not a remaining amount of a battery is sufficient after adjustment by said step (a);

(c) performing a photographing process when a determination result of said step (b) is affirmative; and (d) performing a message generating process in place of the photographing process when the determination result of said step (b) is negative, wherein said step (a) includes the steps of (a-1) repeatedly performing pre-exposure on said image sensor till a focal point is detected, and (a-2) searching the focal point on the basis of image signals obtained by the pre-exposure of said step (a-1), and the photographing process includes a main exposure process for performing main exposure on said image sensor, and a recording process for recording to a recording medium the image signal obtained by the main exposure.

* * * * *